United States Patent
Martorano et al.

(10) Patent No.: US 6,530,477 B1
(45) Date of Patent: Mar. 11, 2003

(54) FLEXIBLE PACKAGING FOR MAINTAINING THE EFFICACY OF CHEMICALS

(76) Inventors: Joseph G. Martorano, 1440 Tyrell, Park Ridge, IL (US) 60068; Paul W. Stiffler, 2063 Burr Oaks La., Highland Park, IL (US) 60035

( * ) Notice: Subject to any disclaimer, the term of this patent is extended or adjusted under 35 U.S.C. 154(b) by 0 days.

(21) Appl. No.: 09/704,172

(22) Filed: Nov. 1, 2000

Related U.S. Application Data

(60) Provisional application No. 60/164,890, filed on Nov. 10, 1999.

(51) Int. Cl.$^7$ ............................................. B65D 85/84
(52) U.S. Cl. ........................... 206/524.2; 206/484.2; 53/467
(58) Field of Search ............................ 206/484, 484.2, 206/524.1, 524.2, 524.4, 524.5, 438; 383/200; 53/450, 461, 467, 473

(56) References Cited

U.S. PATENT DOCUMENTS

| | | | | |
|---|---|---|---|---|
| 2,674,532 A | * | 4/1954 | Pierce | 222/541.3 |
| 3,056,491 A | * | 10/1962 | Campbell | 206/524.1 |
| 3,750,907 A | * | 8/1973 | Steele | 206/524.1 |
| 3,770,122 A | * | 11/1973 | Thiele | 206/484 |
| 4,116,336 A | * | 9/1978 | Sorensen et al. | 206/524.2 |
| 4,303,751 A | * | 12/1981 | Campbell et al. | 206/524.2 |
| 4,598,826 A | * | 7/1986 | Shinbach | 206/524.1 |

OTHER PUBLICATIONS

Electronic Docket for Case No. 02 CH 13080 filed in the Circuit Court of Cook County, Illinois (Medtrol, Inc. v. Infection Control Ventures, Ltd.

* cited by examiner

Primary Examiner—Luan K. Bui
(74) Attorney, Agent, or Firm—Trexler, Bushnell, Giangiorgi, Blackstone & Marr, Ltd.

(57) ABSTRACT

The present invention is directed to a flexible package for housing, chemicals such as sanitizers and/or disinfectants utilizing multiple layers welded together to form a unique laminate. The invention enables maintenance of chemical efficacy, stability and freshness. Preferably, the present invention further includes a towelette pre-saturated with the chemical housed in the unique flexible packaging to facilitate the use of the chemical product.

19 Claims, 2 Drawing Sheets

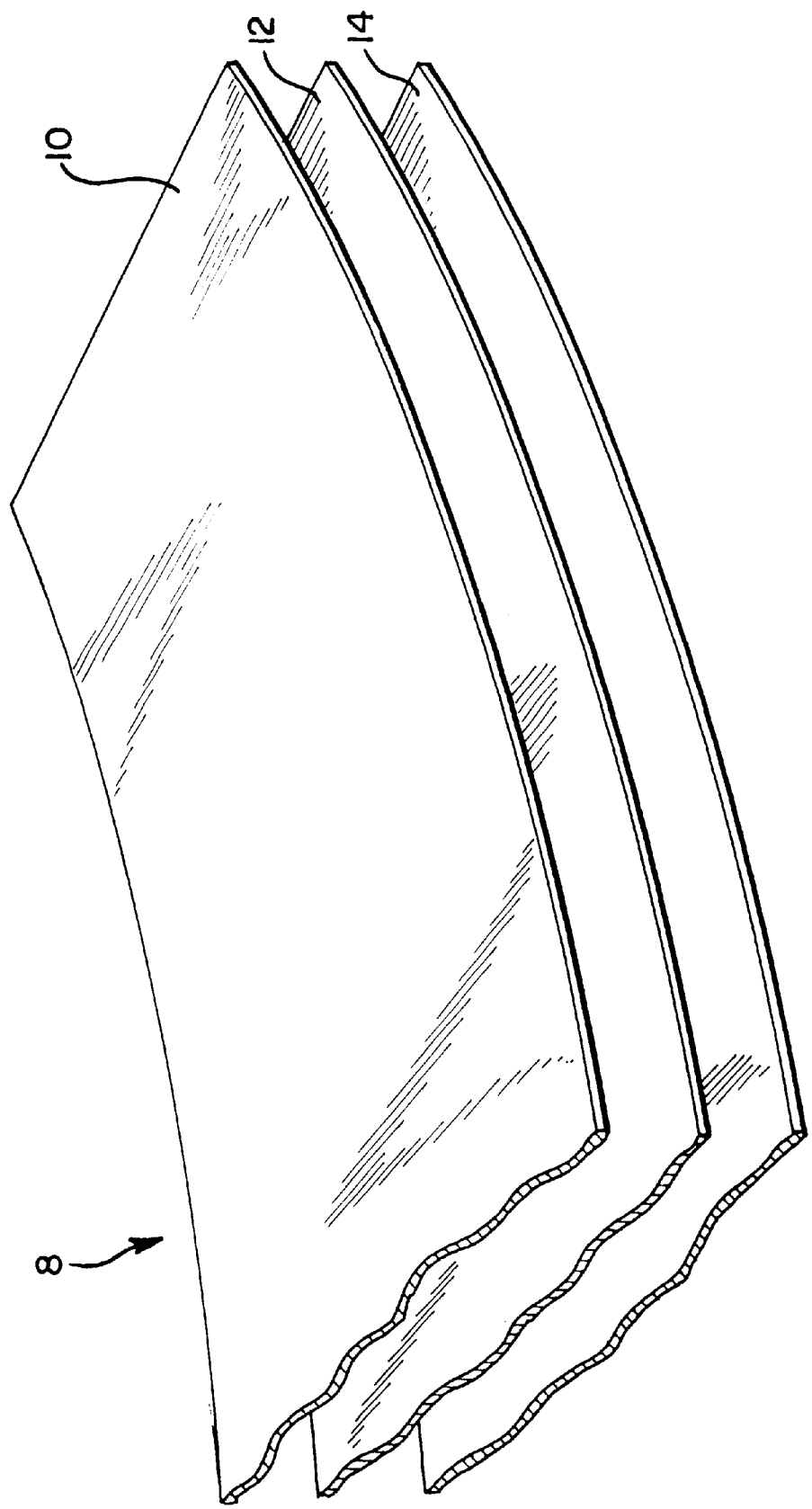
FIG. I

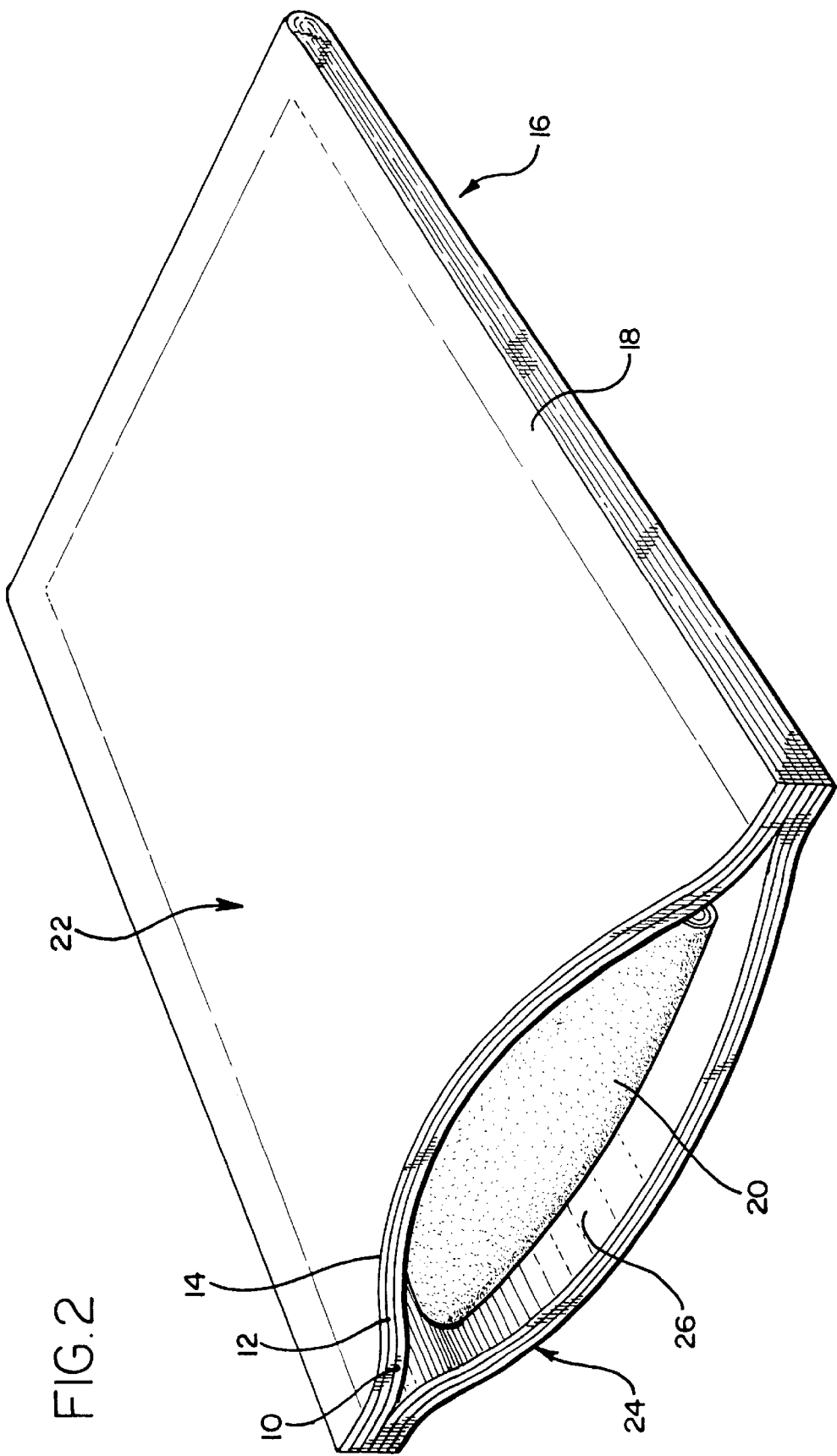

US 6,530,477 B1

FLEXIBLE PACKAGING FOR MAINTAINING THE EFFICACY OF CHEMICALS

RELATED APPLICATION

This application claims the benefit of the U.S. Provisional Application, Serial No. 60/164,890 filed Nov. 10, 1999.

BACKGROUND OF THE INVENTION

1. Field of the Invention

In general, the present invention relates to flexible packaging for chemicals, and more specifically, the present invention relates to flexible packaging for chemicals comprising multiple layers welded together to form a unique laminate capable of effectively containing the chemicals while maintaining chemical efficacy, stability and freshness.

2. State of the Prior Art

Typically, plastic containers are employed to store chemicals because the plastic containers enable the chemicals to possess an extended shelf life. That is, containment of the chemicals in plastic containers allows the chemicals to maintain chemical efficacy, stability and freshness. One such chemical commonly stored in plastic containers is sodium hypochlorite, more commonly referred to as, and including chlorine gas. Containment of these chemicals in plastic containers however, often times makes their use inconvenient and awkward. This increases the danger of exposure of the chemicals to the user. In addition, disposal of the plastic containers used to contain the chemicals, unless properly recycled, greatly increases the bulk in our countries landfills. With the vanishing number of landfills available and the inherent sanitary problems associated therewith, disposal of containers of this type represents a major health problem nationwide.

OBJECTS AND SUMMARY OF THE INVENTION

It is a general objective of the present invention to provide an improved flexible packet for housing chemicals employing multiple layers welded together to form a unique laminate.

It is a related objective of the present invention to provide a flexible packet for housing chemicals which enables the chemicals contained thereby to maintain chemical efficacy, stability and freshness.

It is another objective of the present invention to reduce the volume of waste deposited in landfills as a result of used chemical containers.

It is yet another objective of the present invention to provide a chemically pre-saturated towelette within the flexible packet to facilitate use of chemicals in the form of sanitizers and/or disinfectants.

Other objectives and advantages of the invention will become apparent upon reading the following detailed description and upon reference to the drawings. Throughout the description, like reference numerals refer to like parts.

In accordance with the foregoing objectives, and briefly stated, the present invention comprises flexible packaging for housing chemicals such as sanitizers and/or disinfectants utilizing multiple layers welded together to form a unique laminate. The invention enables maintenance of chemical efficacy, stability and freshness. Preferably, the present invention further comprises a chemically pre-saturated towelette housed in the unique flexible packaging to facilitate use of the chemical product.

BRIEF DESCRIPTION OF THE DRAWINGS

The organization and manner of operation of the invention, together with further objects and advantages thereof may best be understood by reference to the following descriptions taken in connection with the accompanying drawings, in which:

FIG. 1 illustrates the multi-layered flexible material employed to form the wall of the inventive packaging; and FIG. 2 depicts a finished flexible packet of the present invention further illustrating a chemically pre-moistened towelette wipe contained thereby.

DETAILED DESCRIPTION OF THE PREFERRED EMBODIMENT

While the invention will be described in connection with a preferred embodiment thereof, it will be understood that it is not intended to limit the invention to that embodiment. On the contrary, it is intended to cover all alternatives, modifications and equivalents as may be included within the spirit and scope of the invention.

FIG. 1 illustrates a multi-layered laminate 8 utilized to form the wall of the soft, flexible packet for housing chemicals such as sanitizers and/or disinfectants. As shown therein, the laminate 8 contains an internal laminate layer 10, an intermediate laminate layer 12 and an external laminate layer 14. The internal laminate layer 10 is adjacent to one side of the intermediate laminate layer 12 and the external laminate layer 14 is adjacent to the opposite side of the intermediate laminate layer 12. The specific configuration of the multi-layered laminate 8 is critical to ensure successful compatibility with the chemicals intended to be housed thereby. Sodium hypochlorite, a known liquid gas, i.e. chlorine gas, and quaternary ammonium chloride are two examples of chemicals which can be stored within the multi-layered laminate 8 of the present invention. The inherent properties of the sodium hypochlorite are such that the chlorine gas component thereof is responsible for the sanitizing and/or disinfecting capabilities of the chemical. Therefore the chemical packaging made from the multi-layered laminate 8 must not only be liquid impermeable, but must also be gas impermeable, thereby trapping the gas in the packet to maintain the effectiveness of the solution prior to usage thereof. If the chlorine gas were allowed to escape from the sodium hypochlorite solution, the chemical is rendered ineffective and incapable of performing its sanitizing and/or disinfecting function. The specific combination of the laminate layers illustrated enables the packaging to successfully house the chemicals and provide a satisfactory shelf life for same.

The layers of the inventive laminate 8 include a gas impermeable internal laminate layer 10, a liquid impermeable intermediate laminate layer 12 and a protective and supportive external laminate layer 14. In the preferred embodiment, the gas impermeable internal layer 10 is made from plastic, preferably plastic such as that sold under the trademark Surlyn®. Tiny holes, commonly referred to as "pin holes" are inherent in very thin layers of plastic. As the thickness or weight of the plastic is decreased, the presence of pinholes in the plastic increases. These pinholes allow the leakage of gas. Thus, it is important that the plastic internal laminate layer 10 be of sufficient thickness to retain gas within the internal laminate layer 10. Preferably the internal laminate layer 10 is a 22 pound thickness. If the internal laminate layer 10 is not of sufficient thickness and therefore is not gas impermeable, the chemical may loose its efficacy as the gas escapes through the pin holes. For example, in the case of sodium hypochlorite, if the chlorine gas were allowed to escape, the chemical would no longer have the ability to disinfect or sanitize.

The intermediate laminate layer 12 is constructed from foil and provides a liquid barrier. In the preferred embodiment, the intermediate laminate layer 12 is made from foil which is approximately 0.0003 inches thick. In combination with the internal laminate layer 10, this intermediate laminate layer 12 provides a liquid barrier for containing the chemical solution within the packaging. The intermediate laminate layer 12 also functions as an ultraviolet light retardant.

The external laminate layer 14 provides support and protection for the internal and intermediate layers 10, 12. The foil intermediate laminate layer 12 can be susceptible to folding or crinkling. When the foil folds, holes can result and the chemical solution can escape. The external laminate layer 14 provides a support upon which the foil intermediate laminate layer 12 rests so as to prevent folding or crinkling of the intermediate laminate layer 12. This external laminate layer 14 must also be of sufficient thickness to provide support for the internal and intermediate laminate layers 10, 12. Preferably the external laminate layer 14 is 26 pound paper. The paper provides support for the intermediate layer 12 and at the same time provides flexibility allowing the internal and intermediate layers 10, 12 to bend without allowing the foil to fold. Additionally, the external laminate layer 14 provides protection to the foil intermediate laminate layer 12 which can be fragile and may puncture easily when contacted by foreign bodies. If desired, the paper external laminate layer 14 can also be used for printing or labeling.

In the preferred embodiment, a coextrusion process is utilized to form the laminate layers 10, 12, 14 which are thereby welded together to form the multi-layered laminate 8 resulting in a Surlyn®/foil/paper combination. The welded combination allows for easier handling of the layers and simplifies construction of the packet. It is of course anticipated that formation of the packet as described below could be accomplished without first welding the laminate layers 10, 12, 14 together to form a combination. Through the use of the stated combinations of laminate layers or their equivalents, flexible packet storage of chemicals such as sodium hypochlorite and quaternary ammonium chloride becomes practical and effective.

Turning now to FIG. 2, a completed soft packet of the present invention is illustrated generally by reference numeral 16. As shown therein, the packet 16 is formed preferably using a first package wall 22 and a second package wall 24. Each package wall is formed from the laminate layers 10, 12, 14. The package walls 22, 24 are positioned so that the inner layer 10 of the first package wall 22 is adjacent to the inner layer 10 of the second package wall 24. The package walls 22, 24 are then welded together along a seam 18 to form the packet 16 having an internal cavity 26. A chemical solution can be contained within the cavity 26 of the packet 16 once the seam 18 is completed to form the finished sealed packet 16. As mentioned above, use of the chemicals contained by the packet 16 can be facilitated by use of a pre-saturated towelette 20 also contained by the packet 16. The packet 16 illustrated in FIG. 2 is depicted in an open position on one side thereof to disclose the pre-moistened towelette 20 housed in the cavity 26. It will be understood, however, that the finished product would include a welded seam 18 completely around the cavity 26, for sale and storage purposes prior to usage. Alternatively, a single piece of laminate could be folded to create a first wall 22 and a second wall 24, thus requiring a seam on only three sides of the walls 22, 24. Preferably the seam 18 is formed by simultaneously heating the perimeter of the laminate walls 22, 24 to approximately 325–350 degrees Fahrenheit and compressing the laminate walls 22, 24 together.

If a pre-saturated towelette 20 is contained within the cavity 26 of the packet 16, the substrate of the towelette 20 must be inert or non-reactive with the chemical therein. If the towelette substrate 20 were to react with the chemical solution (e.g., sodium hypochlorite or quaternary ammonium chloride), the reaction would render the chemical inactive or ineffective for its intended use as a sanitizer and/or disinfectant. In the case of sodium hypochlorite, a known sanitizer at 200 PPM of free or available chlorine, and a known disinfectant at 5200 PPM, a substrate comprising a polyester or polyethylene structure will suffice. The towelette substrate 20 must be inorganic as opposed to organic, and thus inert so that it will not react with the chemical when housed in the packet 16. If the towelette 20 caused sodium hypochlorite to react or expend its chemical energy/reaction when housed in the packet 16, the residual solution would be salt and water and the chlorine component of the sodium hypochlorite would be exhausted and ineffective. Through use of the inventive packet 16, laboratory studies have revealed that an extended shelf life of up to 18 to 24 months is possible for the chemicals contained thereby.

Again, the foregoing description is for purposes of illustration only and is not intended to limit the scope of protection accorded this invention. While preferred embodiments of the present invention are shown and described, it is envisioned that those skilled in the art may devise various modifications of the present invention without departing from the spirit and scope of the appended claims.

The invention claimed is:

1. A flexible package for providing a stable chemical environment comprising:
    a laminate package wall having an internal plastic layer with a thickness gauged at approximately 22 pounds,
    an intermediate foil layer approximately 0.0003 inches thick, and
    a protective external layer,
    wherein said package wall is folded and sealed to form a closed cavity bounded by said internal layer, and
    wherein a chemical contained within said cavity maintains its efficacy.

2. A flexible package as defined in claim 1, wherein said internal layer is gas impermeable.

3. A flexible package as defined in claim 1, wherein said intermediate layer is liquid impermeable.

4. A flexible package as defined in claim 1 wherein said external layer is paper.

5. A flexible package as defined in claim 1, further comprising an inorganic towelette within said chemical within said cavity.

6. A flexible package as defined in claim 1 wherein said package wall is sealed by heating and compressing portions of said wall.

7. A flexible package as defined in claim 4, wherein said paper external layer has a thickness gauged at approximately 26 pounds.

8. A flexible package for maintaining the efficacy of chemicals comprising:
    internal plastic layer means for forming an impermeable gas barrier, wherein said internal plastic layer means is approximately 22 pounds thick,
    intermediate foil layer means for forming an impermeable liquid barrier, wherein said intermediate foil layer means is approximately 0.0003 inches thick, and external layer means for protecting and supporting said intermediate and internal layer means, wherein said layers are combined to form a wall and said wall is formed and sealed to create a gas and liquid impermeable cavity to contain said chemicals therein, and wherein said chemical contained within said cavity maintains its efficacy.

9. A flexible package for maintaining the efficacy of chemicals as defined in claim 8 wherein said internal, intermediate and external layers are welded together to form a laminate wall.

10. A flexible package for maintaining the efficacy of chemicals as defined in claim 8 wherein said external layer means is paper.

11. A flexible package for maintaining the efficacy of chemicals as defined in claim 8, further comprising an inorganic towelette contained within said chemical within said cavity.

12. A flexible package for maintaining the efficacy of chemicals as defined in claim 8 whereby said wall is sealed by heating and compressing said walls.

13. A flexible package for maintaining the efficacy of chemicals as defined in claim 10, wherein said external layer has a thickness gauged at approximately 26 pounds.

14. A method of maintaining the efficacy of chemicals comprising the steps of providing a plastic, gas impermeable internal layer approximately 22 pounds thick, providing a foil liquid impermeable intermediate layer which is approximately 0.0003 inches thick;

providing an external layer mans which protects and supports said internal and intermediate layers;

combining said internal, intermediate and external layers to form a wall, forming a packet with said wall;

placing said chemicals within said packet; and sealing said packet.

15. A method of maintaining the efficacy of chemicals as defined in claim 14, further comprising the step of welding said internal, intermediate and external layers to form said laminate wall.

16. A method of maintaining the efficacy of chemicals as defined in claim 14, further comprising the step of inserting an inorganic towelette into said chemical within said packet.

17. A method of maintaining the efficacy of chemicals as defined in claim 14, wherein said external layer is paper.

18. A method of maintaining the efficacy of chemicals as defined in claim 17, further comprising the step of printing on said external layer.

19. A method of maintaining the efficacy of chemicals as defined in claim 17, wherein said external paper means has a thickness gauged at approximately 26 pounds.

* * * * *

UNITED STATES PATENT AND TRADEMARK OFFICE
CERTIFICATE OF CORRECTION

PATENT NO. : 6,530,477 B1
DATED : March 11, 2003
INVENTOR(S) : Joseph G. Martorano and Paul W. Stiffler It is certified that error appears in the above-identified patent and that said Letters Patent is hereby corrected as shown below:

<u>Column 6,</u>
Line 3, "mans" should be -- means --

Signed and Sealed this

Tenth Day of June, 2003

JAMES E. ROGAN
*Director of the United States Patent and Trademark Office*